United States Patent [19]
Jeong et al.

[11] Patent Number: 5,634,149
[45] Date of Patent: May 27, 1997

[54] CONTROL CIRCUIT AND METHOD FOR CONTROLLING THE OPERATION OF A CAMERA HAVING A B SHUTTER OPERATING MODE

[75] Inventors: Hyeon-Woo Jeong, Changwon-si; Chang-Hoon Kim, Suwon, both of Rep. of Korea

[73] Assignee: Samsung Aerospace Industries, Ltd., Kyeongsangnam-do, Rep. of Korea

[21] Appl. No.: 582,896

[22] Filed: Jan. 4, 1996

[30] Foreign Application Priority Data

Jan. 6, 1995 [KR] Rep. of Korea .......................... 95-173
Aug. 25, 1995 [KR] Rep. of Korea ........................ 95-26641

[51] Int. Cl.⁶ .................................................... G03B 7/00
[52] U.S. Cl. .................... 396/89; 396/212; 396/292; 396/297
[58] Field of Search ................................. 354/458, 456, 354/267.1, 258.1, 289.1, 459, 460, 461; 396/212, 89, 297, 287, 292

[56] References Cited

U.S. PATENT DOCUMENTS

3,890,625  6/1975  Yoshio et al. ................. 354/289.1 X
3,964,075  6/1976  Ohtaki et al. .................... 354/459 X
5,166,721  11/1992 Akasaka ....................... 354/267.1 X Primary Examiner—W. B. Perkey
Attorney, Agent, or Firm—Finnegan, Henderson, Farabow, Garrett & Dunner, L.L.P.

[57] ABSTRACT

A control circuit for operating a camera in the B shutter mode includes a microcontroller for computing an appropriate film exposure time period based on a measurement of ambient light in a scene to be photographed. Under the control of a user-actuated shutter switch, the microcontroller opens the camera shutter, counts off the computed exposure time period, and closes the shutter at the end thereof. The control circuit includes the capability of permitting the user to compensate the computed exposure time period, abort the computed exposure time period, end the computed exposure time period prematurely, and select an exposure time period in place of the computed exposure time period. Exposure times are displayed to facilitate user compensation, premature conclusion, and independent selection of the film exposure time period, in order to facilitate successful practice of time exposure photography.

18 Claims, 12 Drawing Sheets

CONTROL CIRCUIT AND METHOD FOR CONTROLLING THE OPERATION OF A CAMERA HAVING A B SHUTTER OPERATING MODE

BACKGROUND OF THE INVENTION

1. Field of the Invention

The present invention relates to photography, and more particularly to a control circuit and method for practicing time exposure photography.

2. Description of the Prior Art

Typical shutter speeds in a single lens reflex camera range from 1/8000 seconds to 30 seconds (the fastest shutter speed typically varying with type of camera). For time exposures of more than 30 seconds, typically requiring a manual mode of operation in a single lens reflex camera, the user switches to a B shutter photographing mode.

To photograph scenes under low ambient light conditions, time exposure photography is typically practiced without artificial light. To take a time exposure picture, the user sets the camera to the B (Bulb) shutter mode. The shutter button is depressed to open the shutter, and the shutter remains open to expose the film as long as the shutter button is held depressed. The film exposure time is concluded when the shutter button is released. Alternatively, the B shutter mode may be executed in some cameras by depressing and releasing the shutter button to open the shutter and then pressing and releasing the shutter button again to close the shutter.

However, the exposure time required to obtain a correctly exposed photograph depends on the user's experience with time exposure photography. Too short an exposure time, and the resulting picture is dark. Too long an exposure time, and the resulting picture is washed out. In neither case is the picture of an acceptable quality.

It is difficult, particularly for an inexperienced photographer, to obtain proper film exposure time using the B shutter mode, since it is left to the photographer to determine the proper exposure time. Also, having to manually actuate the shutter button to open and close the shutter is inconvenient and may cause camera motion that could spoil the picture.

SUMMARY OF THE INVENTION

An objective of the present invention is to overcome the above-noted problems of the prior art by providing a control circuit for a camera having a B shutter mode and methods by which the control circuit can be conditioned to operate, such as to enable time exposure photography to be practiced successfully, even by an inexperienced photographer.

To achieve this objective in accordance with one aspect of the present invention, as embodied and broadly defined herein, a camera control circuit is provided to include features, as follows: a mode selector accommodating user selection of a B (Bulb) shutter camera mode of operation; a light detector circuit for producing a signal representing ambient light of a scene to be photographed; a controller, coupled to the mode selector and the light detecting circuit, for computing a film exposure time period based on the ambient light signal when the user selects the B shutter camera mode; and an actuator, coupled to the controller, for opening a camera shutter and subsequently closing the camera shutter based on a computed film exposure time.

According to another aspect of the present invention, as embodied herein, a camera control circuit is provided to includes features, as follows: a mode selector accommodating user selection of a B shutter camera mode of operation; a light detector circuit for producing a signal representing ambient light of a scene to be photographed; a microcontroller connected to the mode selector and the light detecting circuit for computing a film exposure time period based on the ambient light signal when the user selects the B (Bulb) shutter camera mode, the microcontroller including a clock for timing the computed exposure time period, the controller generating a start signal to begin the computed exposure time period and an end signal at the expiration of the computed exposure time period; a display connected to the microcontroller for displaying the computed time exposure period; and an actuator connected to the microcontroller for opening a camera shutter in response to the start signal and closing the camera shutter in response to the end signal.

Further, in accordance with another aspect of the present invention, there is provided a method for controlling operation of a camera, comprising the steps of: selecting a B shutter operating mode of the camera; measuring the ambient light of a scene to be photographed by the camera in the B (Bulb) shutter operating mode; computing a film exposure time period based on the measured ambient light of the scene; displaying the computed exposure time period; detecting user inputs indicating a desire to compensate the computed exposure time period; compensating the computed exposure time period in accordance with the user inputs when detected; displaying the compensated exposure time period when the computed exposure time is compensated; opening a shutter of the camera for a film exposure time period determined by the computed exposure time period, unless the computed exposure time period has been compensated, whereupon, the film exposure time period is determined by the compensated exposure time period.

Additional objects and advantages of the invention will be set forth in part in the description which follows, and in part will be obvious from the description, or may be learned by practice of the invention. The objects and advantages of the invention will be realized and attained by means of the structural features and the method steps and combinations thereof, as particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one several embodiments of the invention and together with the description, serve to explain the principles of the invention.

BRIEF DESCRIPTION OF THE DRAWINGS

Corresponding reference numerals refer to like parts throughout the several views of the drawings.

Figure 1:
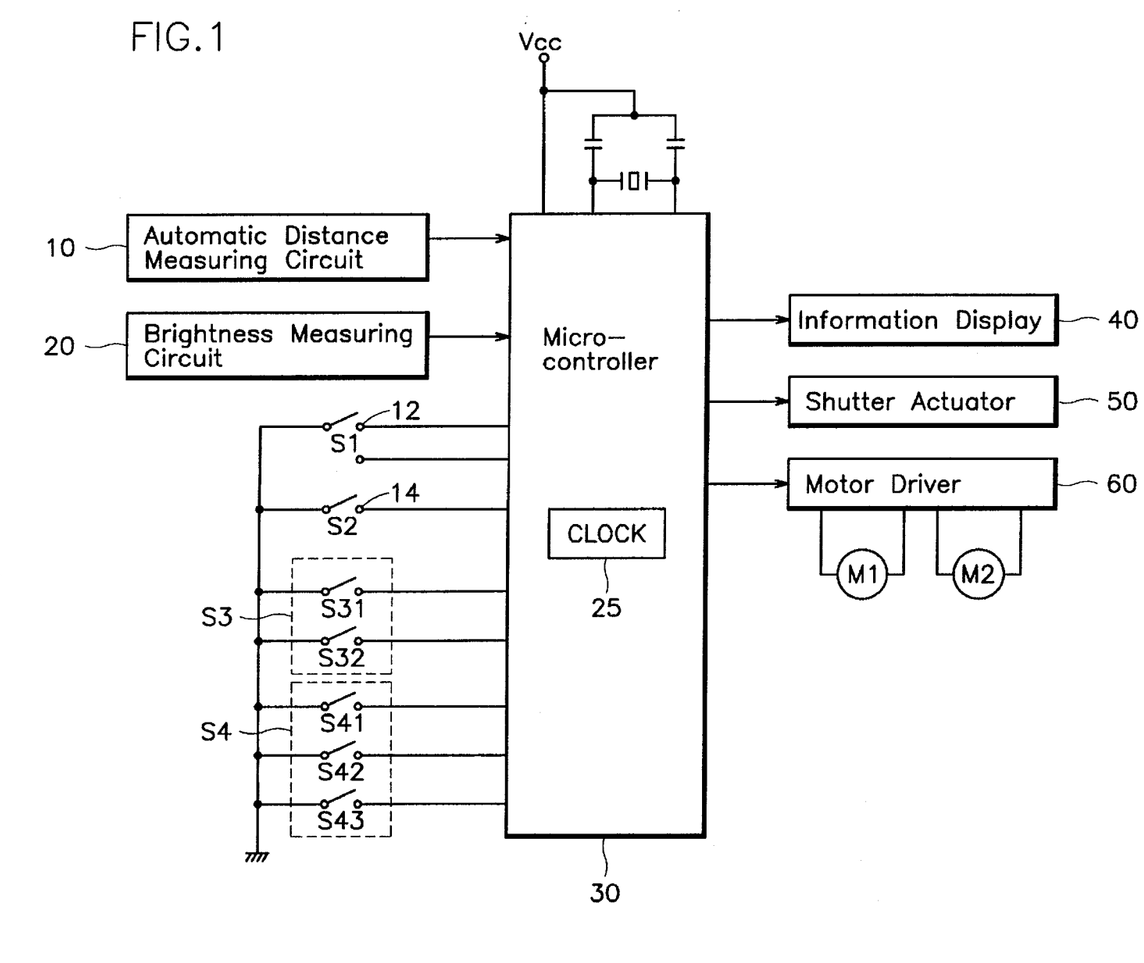
FIG. 1 is a block diagram of a camera control circuit in accordance with one embodiment of the invention for practicing successful time exposure photography.

In the camera control circuit of the present invention seen in FIG. 1, switch S1 is a three-position shutter release switch; switch S2 is a camera operating mode setting switch; switch S3 is an exposure time setting switch pair, including a down incrementing time switch S31 and an up incrementing time switch S32; and switch S4 is an exposure time unit selecting switch array, including an hour mode select switch S43, a minute mode select switch S42, and a second mode select switch S41. User actuations of these switches generate signal inputs to a microcontroller 30. Also providing inputs to microcontroller are an automatic distance measuring circuit 10 for auto focusing the camera to a subject in a scene to be photographed and a brightness measuring circuit for generating signals indicative of the ambient lighting of a scene to be photographed. In response to these inputs, microprocessor generates user information for display on an information display 40, such as an LCD illustrated in FIGS. 8–13, generates actuation signals to a shutter actuator 50 for opening and closing the camera shutter (not shown); and generates activating signals to a motor driver 60 operating to drive a film advance/rewind motor M1 and lens positioning motor M2 to auto-focus the camera according to the range signals generated by the automatic distance measuring circuit 10.

Operation of the camera control circuit of FIG. 1 in accordance with a first embodiment of the invention will be now be described in conjunction with the flow diagrams of FIGS. 3A and 3B.

When power is applied to the camera, including the control circuit of FIG. 1, (Step S100), the microcontroller initializes the camera parameters (Step S110) and, in Step S120, determines whether the B (Bulb) shutter mode has been selected by the user's actuation of switch S2. If the B shutter mode has not been selected, a picture is taken in the normal routine according to the shutter speed and f/stop settings of the camera imposed manually or automatically by the distance and brightness measuring circuits of FIG. 1 (Step S140). After the picture is taken in the normal routine, the microprocessor skips to end Step S440.

Figure 2:
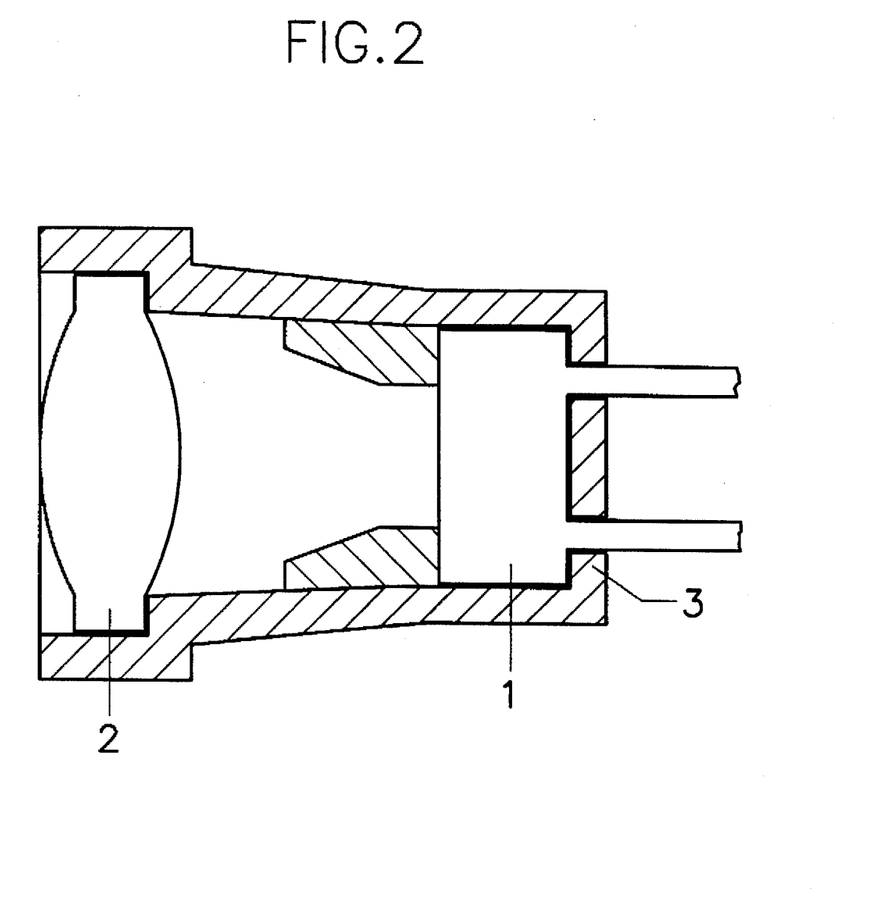
FIG. 2 is a cross-sectional view of an ambient light measuring element utilized in the circuit of FIG. 1.

However, if the B shutter mode has been selected, i.e., a time exposure picture is to be taken, the microprocessor determines (Step S130) whether the shutter release switch S1 in FIG. 1 has been actuated from the illustrated open position to a first step position closing on contact 12. If not, the microprocessor loops back and checks again for a first step actuation of switch S1. This operation continues until switch S2 is actuated to its first step position. The microcontroller then processes the signal input from the brightness measuring circuit 20 in FIG. 1 to determine the prevailing ambient light conditions of the scene to be photographed (Step S150). As shown in FIG. 2, this brightness measuring circuit may simply take the form of a lens 2 that concentrates light from the scene onto a sensor 1, which then outputs a signal to the microcontroller indicative of the scene ambient lighting. Based on this ambient lighting signal, the microcontroller 30 computes in Step S160, an appropriate film exposure time for a time exposure photograph of a scene, consistent with an established iris opening (f/stop setting) of the camera. The computed exposure time is then displayed by display 40 (FIGS. 1 and 8–13) in Steps 170 and S180.

The microcontroller then auto focuses the camera and checks to see if the shutter release switch has been actuated to its second step position closing on contact 14 seen in FIG. 1 (Step S190). If not, the microcontroller 30 checks to see if the user has actuated either of the time setting switches S31 and S32 in FIG. 1 (Step 200). If neither of the switches has been actuated by the user, the microcontroller then checks in Step S220 to determine if the user has actuated mode switch S2 in FIG. 1. If the user has actuated switch S2 to signal the microcontroller of a desired change in the camera mode, the camera is conditioned to the new mode (Step S220), thereby cancelling the B shutter mode. The display 40 is blanked (Step 230) and microcontroller operation is ended (Step S440).

If the user has not actuated mode switch S2 to cancel the B shutter mode, the routine loops back through steps S170 and S180 to Step S190, and the actuated position of switch S1 is again checked. If this switch is actuated to its second step position by the user, the exposure time display is zeroed (Step 240), and the camera shutter is opened by shutter actuator 50 in response to a start signal from the microcontroller to begin a manual B shutter mode exposure of the film (Step S250). The film exposure time is counted off by a clock 25 included in microcontroller 30 (FIG. 1). The microcontroller then monitors the position of shutter release switch S1 in step S260. As long as this switch is in its first step position, the microprocessor continuously displays the lapsed time on display 40 (Step S270), so the user is kept advised of the time the shutter has been held open. When the microcontroller detects that the user has actuated shutter release S1 to the open position (Step S280), an end signal is sent to shutter actuator 50 to close the shutter, the display is blanked (Step S230), and microprocessor operation is ended (Step S440).

Figure 3A:
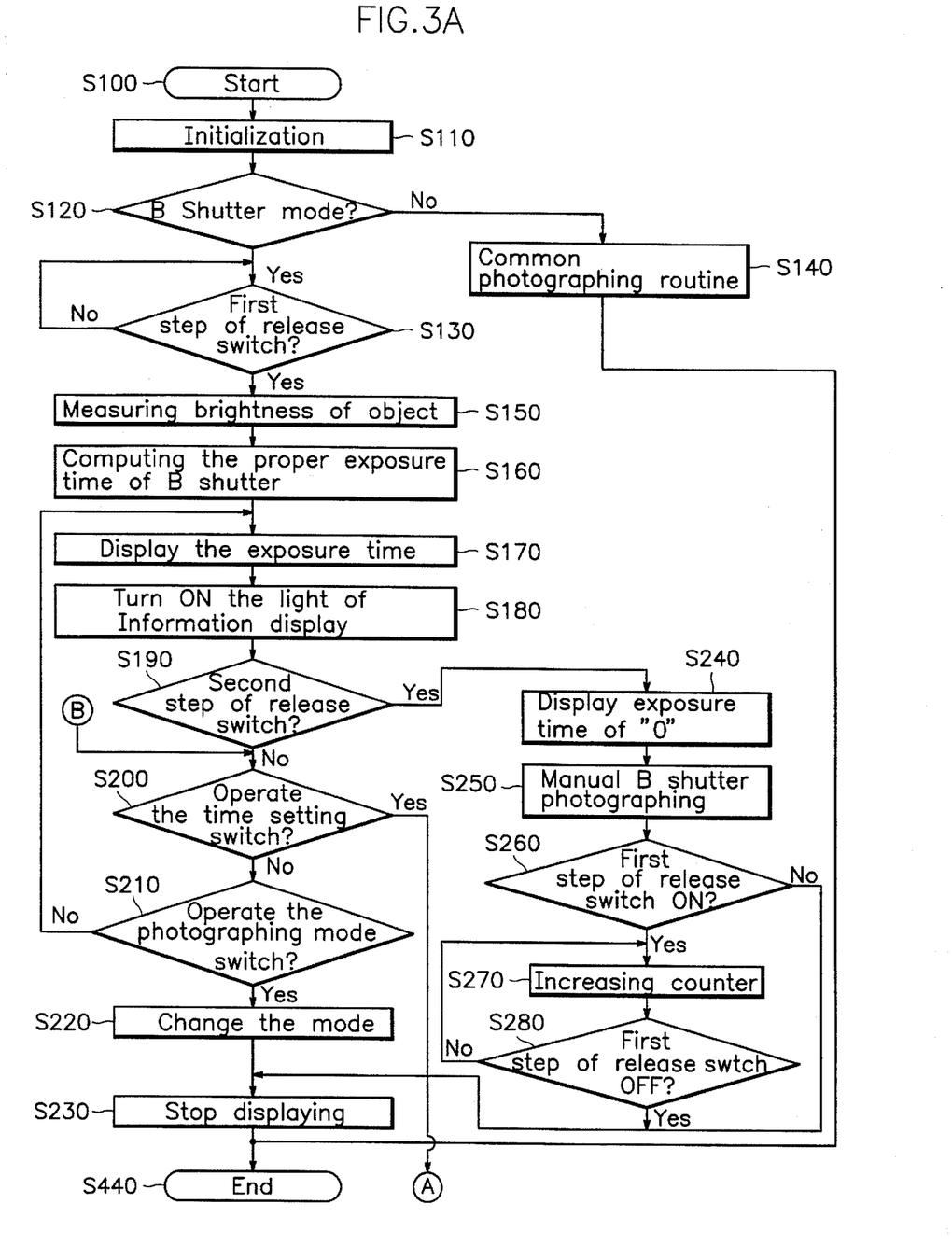
FIGS. 3A and 3B are flow diagrams illustrating operation of the circuit of FIG. 1 in accordance with one embodiment of the invention.
Figure 3B:
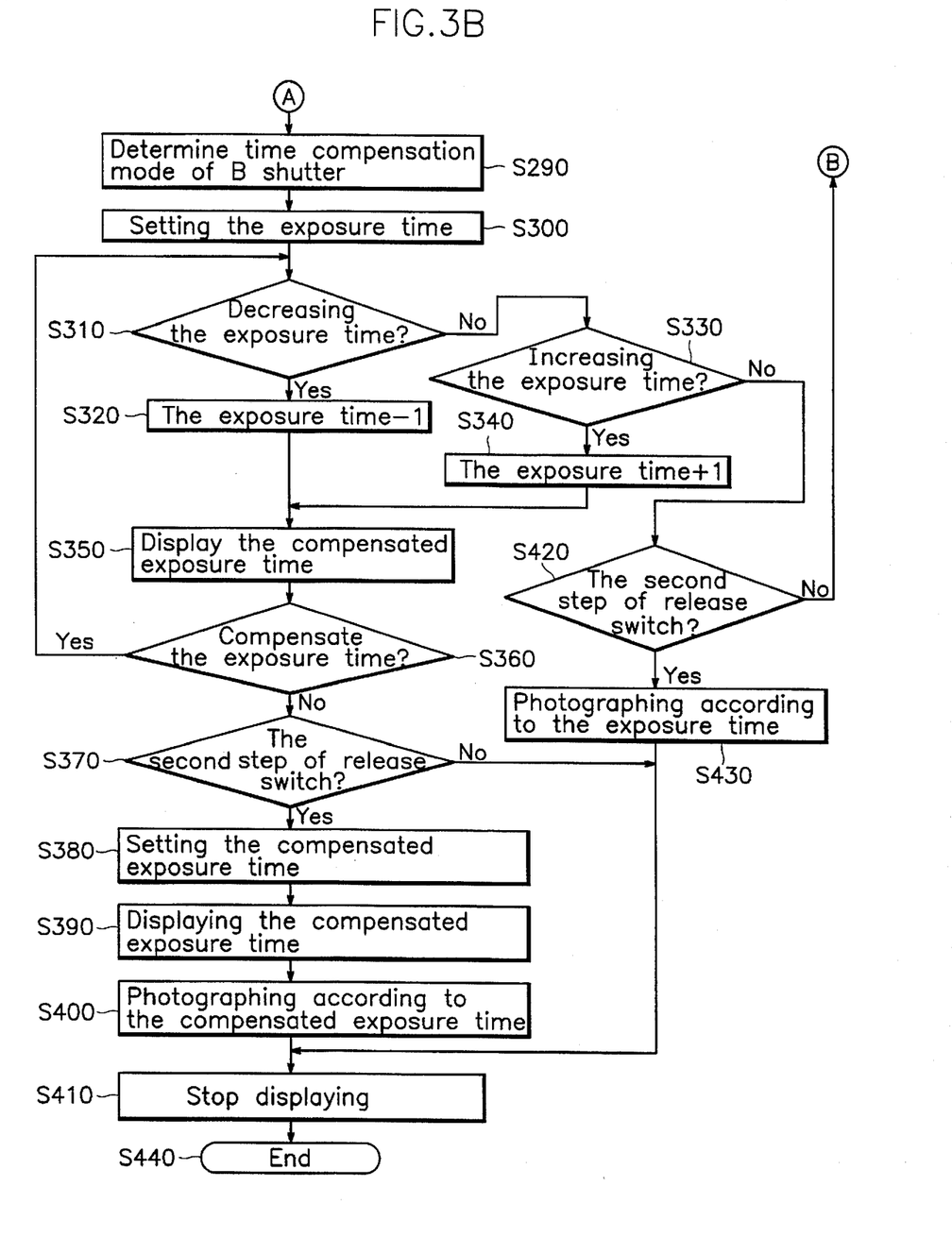

If the microcontroller detects that the user has actuated either of the time setting switches S31 or S32 in Step S200, the flow diagram of FIG. 3A is exited at point A and the microcontroller executes the steps illustrated in FIG. 3B. It is appreciated that actuation of these switches by the user signals the microcontroller that the user wishes to compensate or adjust the computed exposure time displayed on display 40, as indicated by Step S290 in FIG. 3B. The microprocessor then enters a subroutine allowing the user to compensate the computed exposure time, as indicated by Step S300. The microcontroller first checks to see if the down increment time switch S31 has been actuated by the user (S310). If it has, the microprocessor decrements the computed exposure time by one time increment, e.g., one minute (Step 320). The compensated exposure time is then displayed in Step S350. If the microcontroller detects that switch S31 is actuated again or remains actuated, Steps S310, S320, and S350 are repeated to further decrement the computed exposure time. When the user is satisfied the computer exposure time has been compensated downwardly to a satisfactory duration, switch S31 is opened, a condition detected by the microcontroller in Step S360, the microcontroller then monitors the condition of shutter release switch S1 in Step S370. If the shutter release switch S1 is actuated to its second step position within a preset time-out period, the compensated exposure time is set in the microprocessor (Step S380) and displayed on display 40 (Step S390), and the camera shutter is then opened in response to the start signal for the duration of the compensated exposure time setting (Step S400) counted by clock 25 to take a time exposure photograph of the scene. When the shutter is closed in response to the end signal, the display is blanked in Step S410, and the microprocessor operation is concluded (Step 440). If the shutter release switch S1 is not actuated to its second step position within the time-out period (Step 360), the microprocessor skips to Step S410, blanks the display, and operation is concluded (Step S440).

Still referring to FIG. 3B, if the microprocessor determines in Step S310 that the time decremented switch S31 has not been actuated, the microprocessor checks to see if the time incrementing switch S32 has been actuated (Step 330). If it has, the computed exposure time is incremented one time unit in Step S340, and the incremented exposure time is displayed (Step S350). As long as switch S32 remains actuated, a condition detected in Step 360, the microcontroller loops back through Steps S310, S330, S340, and S350. When the computed exposure time has been compensated upwardly to the satisfaction of the user, switch S32 is opened, and this event is detected in Step S330. The microcontroller then awaits the user's actuation of the shutter release switch S1 to the second step position (Step S420). When the user does so, the camera shutter is opened for the duration of the upwardly compensated exposure time to take a time exposure photograph of the scene (Step S430). When the shutter is closed, the display is blanked (Step S410), and the operation is concluded (Step S440).

If, in Step S420, the microprocessor determines that the user has not actuated the shutter release switch S1 to its second step position within the preselected time-out period, the microprocessor exits the flow chart at point B in FIG. 3B and reenters the flow diagram at point B in FIG. 3A to execute the various steps S200, S220, S230, and S440 described above.

Figure 4:
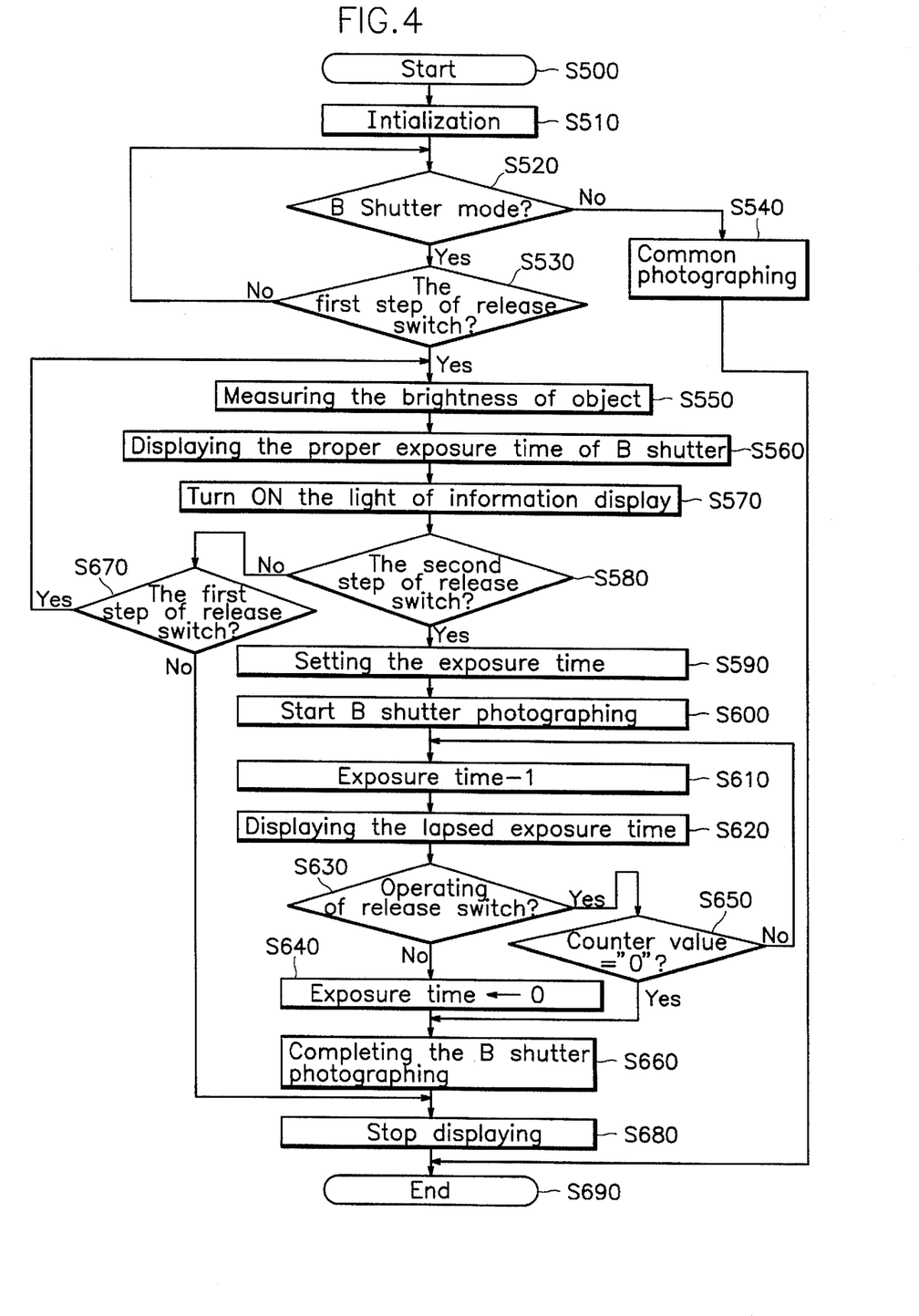
FIG. 4 is a flow diagram illustrating operation of the circuit of FIG. 1 in accordance with another embodiment of the present invention.

The flow diagram of FIG. 4 illustrates the operation of the control circuit of FIG. 1 in accordance with an alternative embodiment of the invention. Steps S500, S510, S520, S530, S540, and S550 in FIG. 4 correspond respectively to steps S100, S110, S120, S130, S140, and S150 in FIG. 3A and thus their descriptions are not repeated here for the sake of brevity. In steps S560 and S570 of FIG. 4, the proper exposure time for the B shutter mode is computed and displayed by microcontroller 30. In Step 580, the microcontroller 30 detects whether the shutter release switch S1 is in its second step position. If not, the microcontroller checks to see if the shutter release switch is in its first step position. If it is, the microcontroller loops back through steps S550, S560, and S570, and S580, waiting for the user to actuate the shutter release switch S1 to its second step position. If, at any time, the user actuates the shutter release switch to its open position, (detected by Steps S580 and S670) the B shutter mode is aborted, and the display 40 is turned off (S680), concluding microcontroller operation (Step S690).

When the microcontroller detects that the shutter release switch S1 has been actuated to its second step position, the microcontroller sets the computed exposure time (Step S590) and opens the shutter to begin taking a time exposure to the scene (Step 600). When the shutter is opened, the microcontroller clock 25 begins counting down from the computed time (Step S610) and provides a continuous display of the time remaining to the conclusion of the computed exposure time in Step 620. While the computed exposure time is lapsing, the microcontroller continuously monitors shutter release switch S1 in Step S630. If this switch is actuated to its off position, the microprocessor zeros the lapsed time count (Step S640), regardless of the actual elapsed time count, and the shutter is closed by shutter actuator in response to the end signal in Step 660 to conclude the time exposure photograph of the scene at a shorter exposure time than the computed exposure time. The display 40 is turned of (Step S680), and the microcontroller operation is concluded (Step S690).

As long as the shutter release switch is detected to be in its second step position in Step 630, until the computed exposure time has been counted down to zero, as detected in Step S650, the microprocessor continuously loops through Steps S610, S620, S630, and S650 to continue the computed exposure time countdown by clock 25. When the microprocessor determines that this countdown has reached zero in Step S650, the camera shutter is closed (Step 660) to complete the time exposure photograph, the display is turned off (Step 680), and microprocessor operation is concluded (Step S690).

Figure 5:
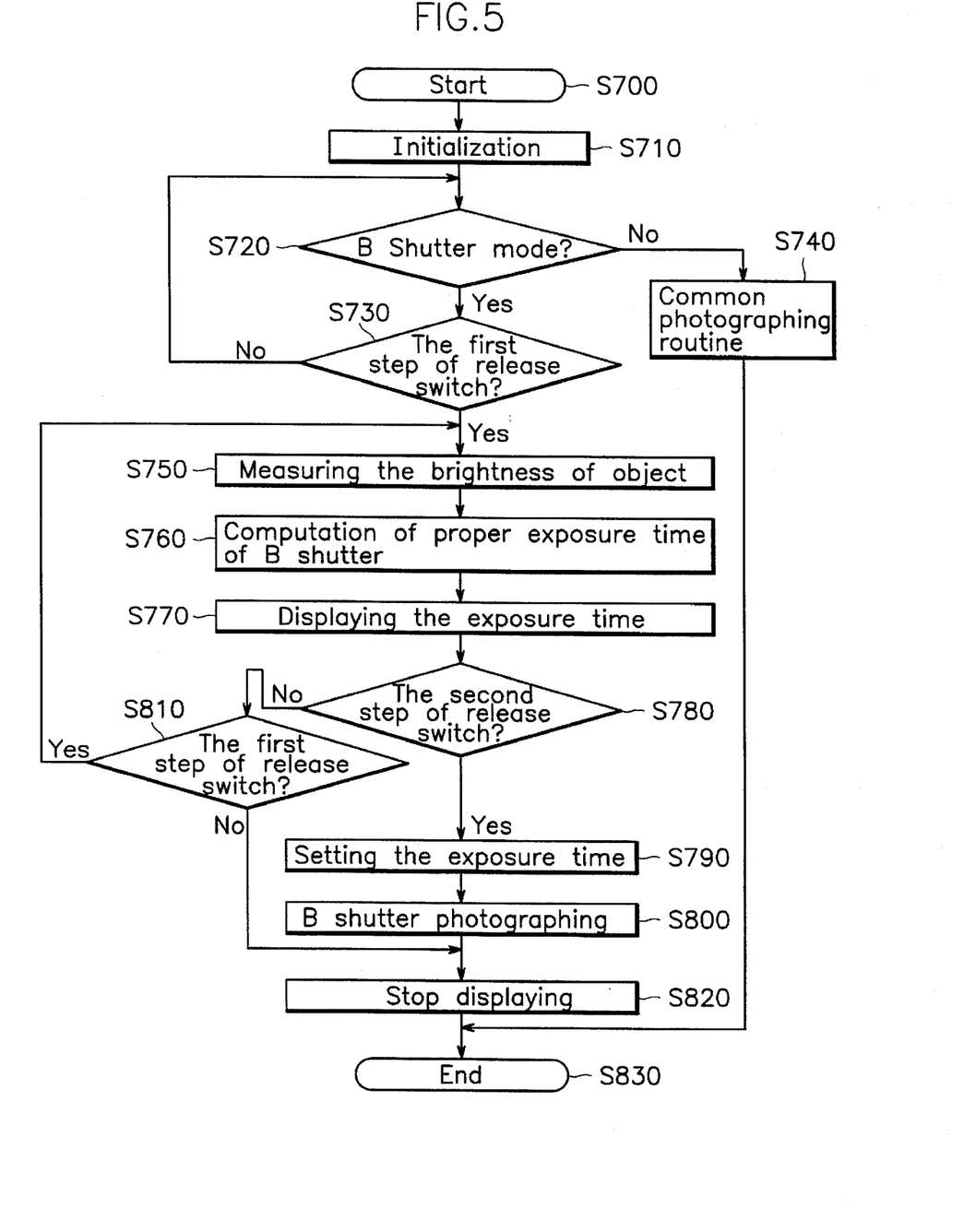
FIG. 5 is a flow diagram illustrating operation of the circuit of FIG. 1 in accordance with a further embodiment of the invention.

The flow chart of FIG. 5 illustrates an operation of the control circuit of FIG. 1 in accordance with yet another embodiment of the present invention.

As in the embodiments described above, the microcontroller 30 is powered up in Step S700, camera parameters are initialized in Step S710, and the microcontroller checks to see if the B shutter mode has been set by mode switch S2 in FIG. 1. If the B shutter mode has not been set, a photograph is taken in accordance with the normal photographing routine (S740), as described above with respect to Step S140 in FIG. 3A.

As long as the B shutter mode is set, the microcontroller waits for the user to actuate the shutter release switch S1 in FIG. 1 to the first step position in Step S730. When this is done, the microcontroller processes the ambient light signal from the brightness measuring circuit 20 in FIG. 1 to determine the prevailing ambient light conditions of the scene to be photographed (Step S750). Based on the ambient light measurement, the microcontroller computes an appropriate exposure time for the B shutter mode (Step S760). The computed exposure time is displayed on display 40 (Step S770). The microcontroller then checks in Step S780 to see if the shutter release switch is in its second step position. If not, the microcontroller checks (Step S810) to see if this switch is in its first step position. If the user has actuated the shutter release switch to its open position, display 40 is turned off (Step S820), and microcontroller operation is concluded (Step S830).

If in step S810, the microcontroller determines that the shutter release switch is in its first step position, the microcontroller re-executes Steps S750, S760, and S770, such that the computed exposure time will be updated in the event that ambient light conditions of the scene have changed.

When the microcontroller detects that the shutter release switch has been operated to its second step position in Step 780, the most recent exposure time computation is set by the microcontroller in Step S790, and the camera shutter is opened for the duration of the set exposure time, so as to take a time exposure photograph (Step S800). When the shutter is closed, the display 40 is turned off (Step S820), and microprocessor operation is concluded (Step S830).

Figure 6A:
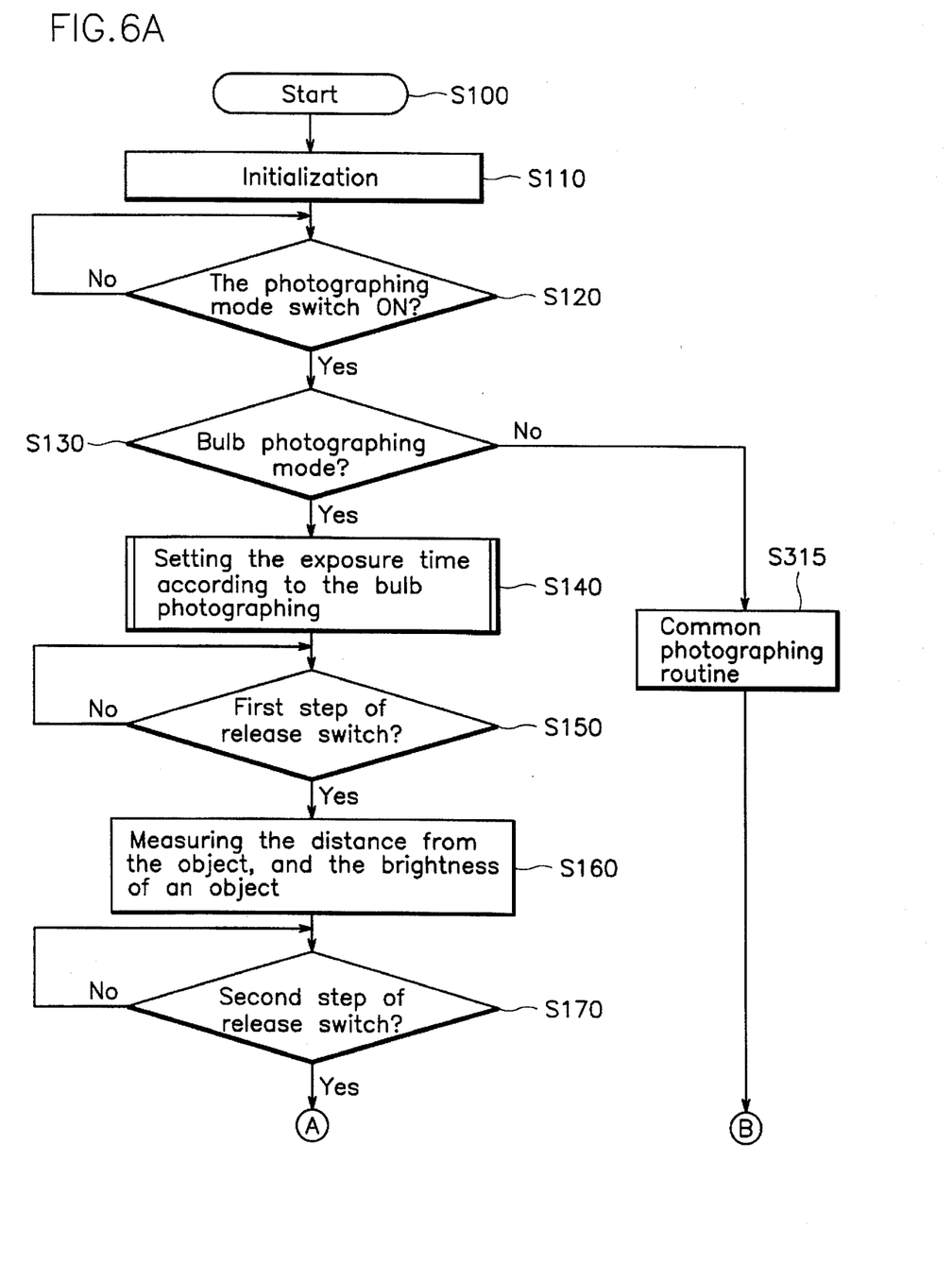
FIGS. 6A and 6B are flow diagrams illustrating operation of the control circuit of FIG. 1 in accordance with yet another embodiment of the present invention.
Figure 6B:
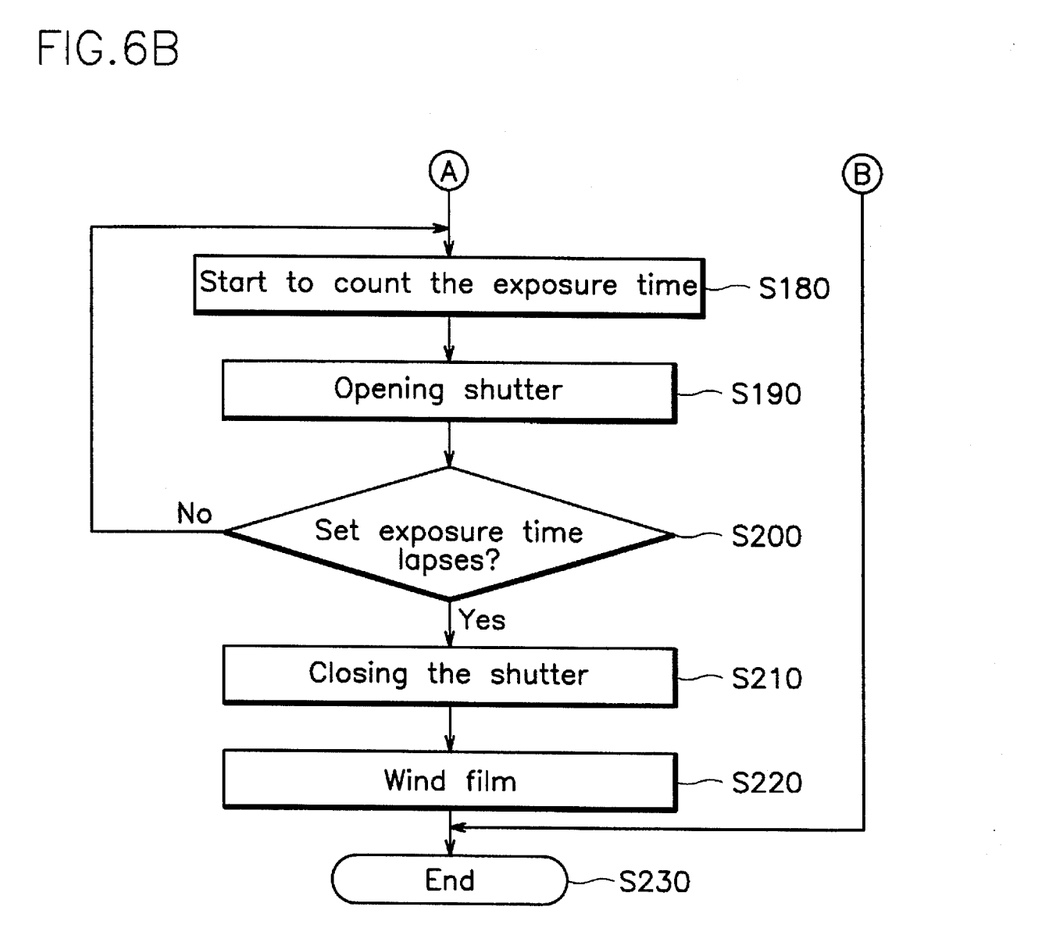

Flow diagrams 6A and 6B illustrate operation of the control circuit of FIG. 1 in accordance with a further embodiment of the present invention.

Referring first to FIG. 6A, the microcontroller 30 is powered up in Step S100, and the camera parameters are initialized in Step S110. The microcontroller then monitors the mode switch S2, waiting for the user to select a shutter mode appropriate for the scene to be photographed. Shutter mode selections may be made by repeatedly actuating the mode switch until the desired shutter mode is indicated on display 40. Once a mode selection has been made by the user, the microprocessor checks to see if it is the bulb (B shutter) photographing mode in Step S130. If not, the photograph is taken in Step S135 according to the normal photographing routine described in connection with FIG. 3A.

In Step S140, the user selectively actuates switches S41, S42, and S43 of the exposure time select switch array S4 in FIG. 1, so as to manually set a desired exposure time. The microprocessor then waits for the user to actuate the shutter release switch S1 to its first step position in Step S150, and, when this is done, the microprocessor auto-sets a camera focus in accordance with the input from the automatic distance measuring circuit 10 and determines the amount of ambient light in the scene to be photographed based on the input from the brightness measuring circuit 20 of FIG. 1 (Step S160). Since the user has set a desired exposure time in Step S140, the microcontroller does not compute a B shutter exposure time. However, the measured ambient lighting condition signal may be used to set an appropriate lens opening (f/stop).

The microcontroller 30 then awaits the user's actuation of the shutter release switch S1 to its second step position in Step 170. When the user does so, the microcontroller opens the camera shutter and begins to count off the user selected exposure time and, as indicated in Steps S180 and S190, respectively, of FIG. 6B. When the microcontroller detects that the exposure time has been counted down to zero in Step S200, the shutter is closed in Step 210, and the film is advanced one frame in Step S220, whereupon microprocessor operation is concluded (Step 230).

Figure 7A:
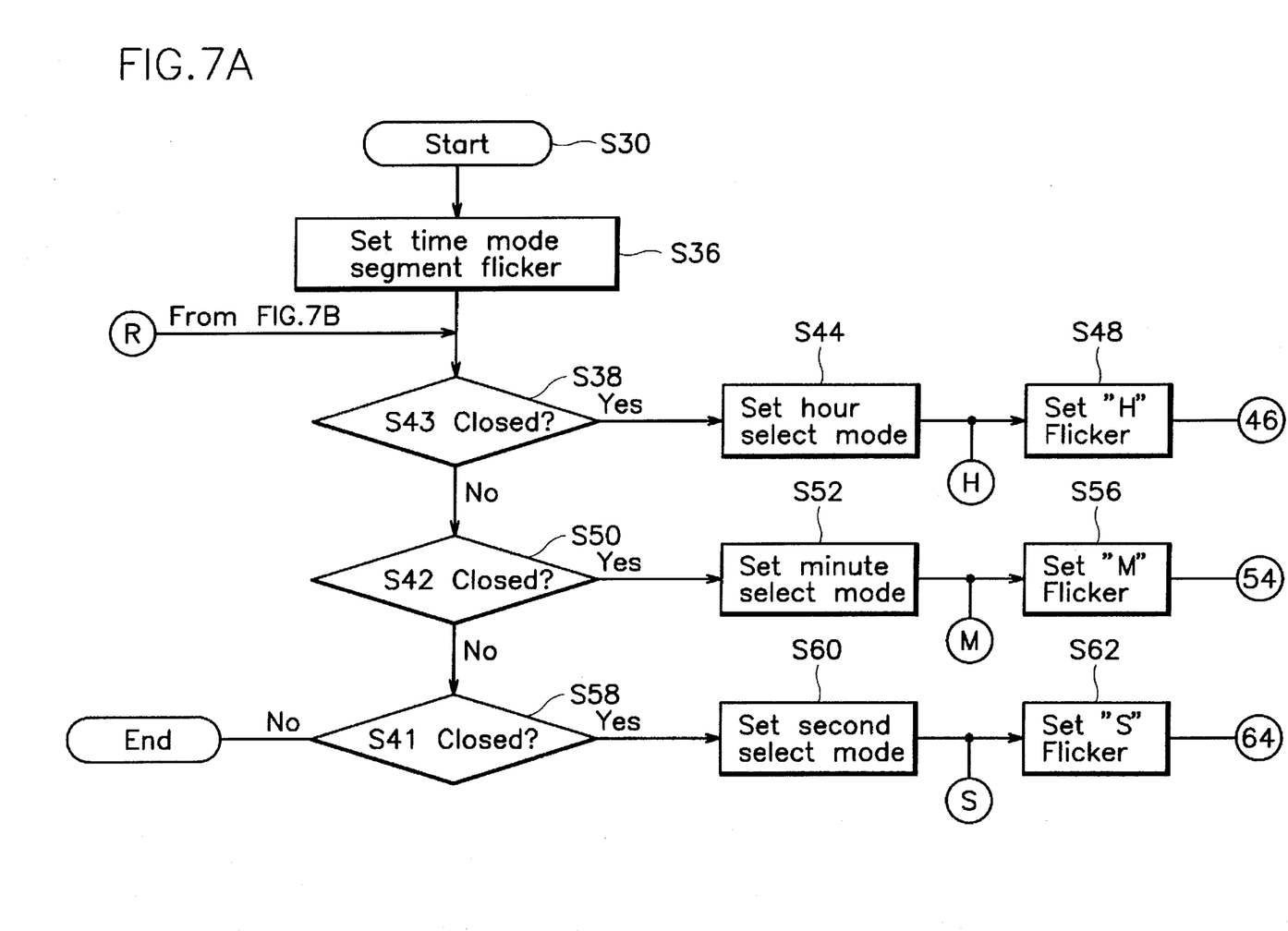
FIGS. 7A and 7B are flow charts illustrating, in combination, a subroutine included in the flow chart of FIG. 6A.
Figure 7B:
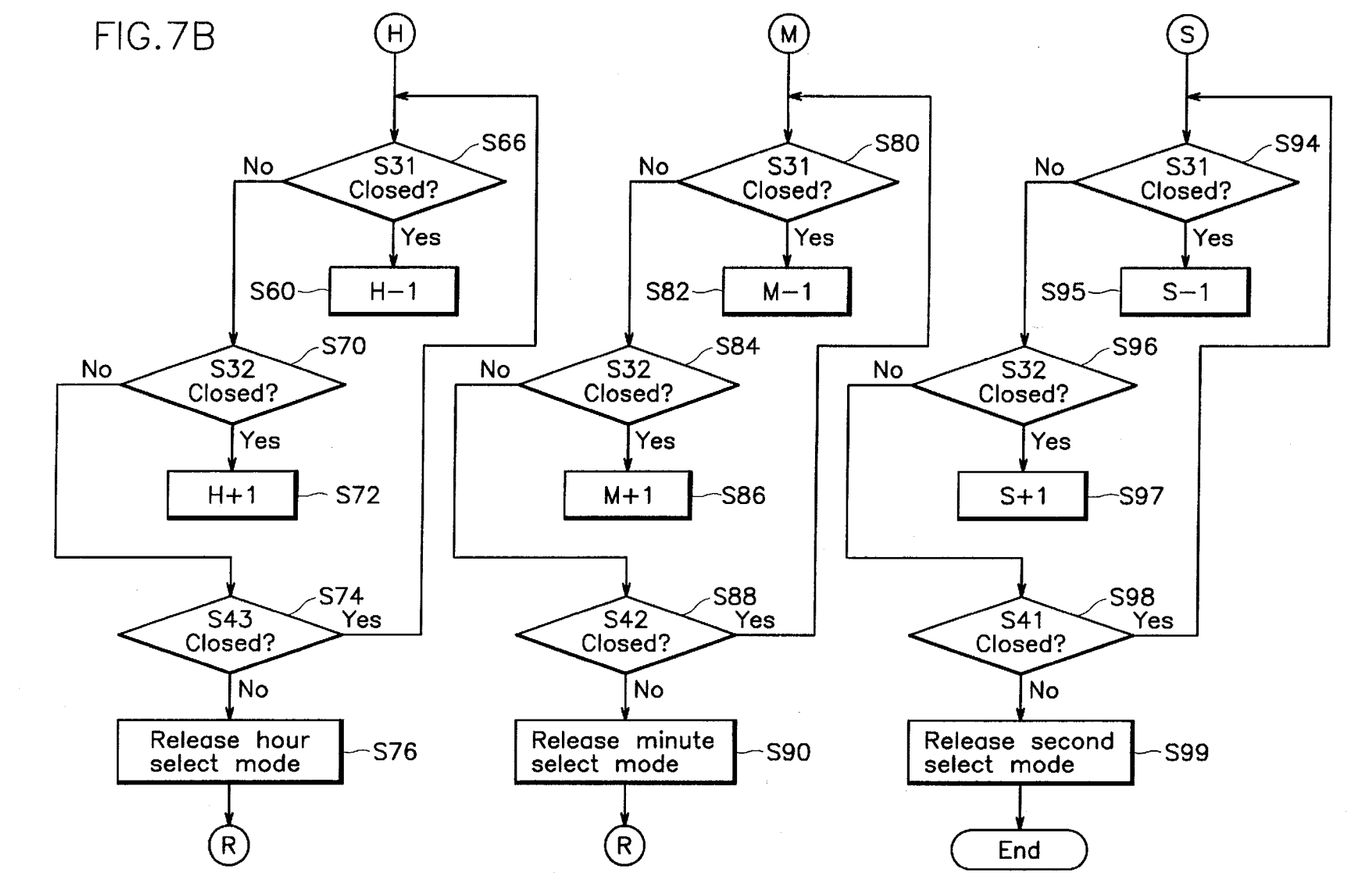
Figure 8:
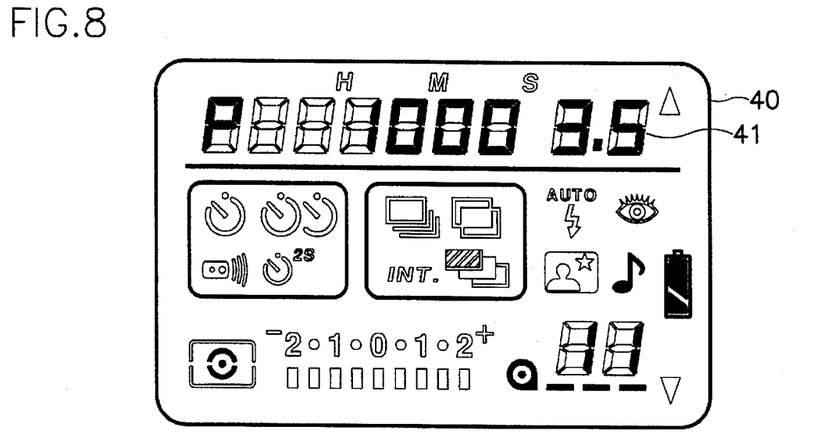
FIGS. 8 to 13 are illustrations of various displays of camera conditions provided by a display included in the control circuit of FIG. 1.
Figure 9:
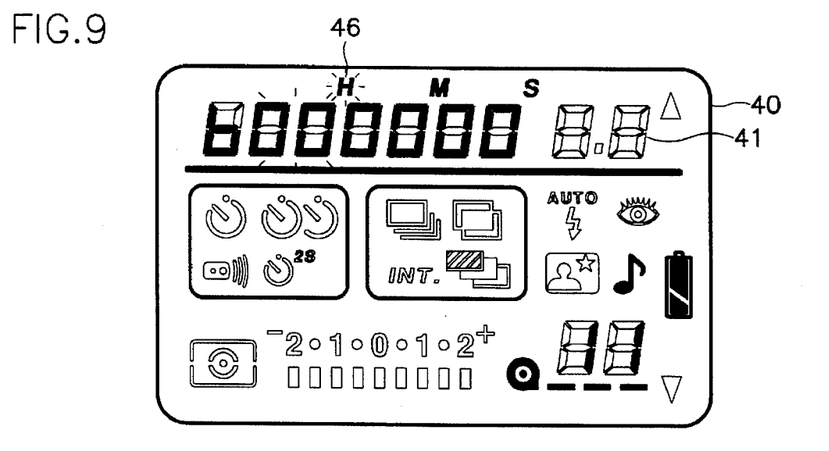

FIGS. 7A and 7B, in combination, illustrate in detail a subroutine for setting the B shutter exposure time by the user in Step S140 of FIG. 6A. This subroutine is entered at start S30 in FIG. 7A. In Step S31, the display of the time mode segment 41 of display 40 seen in FIGS. 8–13 is set to flicker. The microcontroller then checks in Step S40 to see if the hour select switch S43 in FIG. 1 is closed. If the hour select switch has been closed by the user, an hours select mode is set and an arbitrary hours number, e.g. 0, is displayed (Step S44). An hour select indicator element 46 is flickered, as indicated in FIG. 9, (Step S48).

Figure 10:
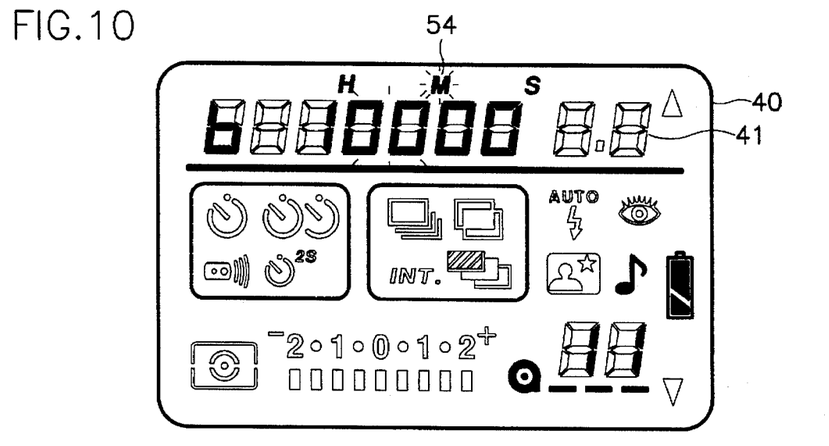
Figure 11:
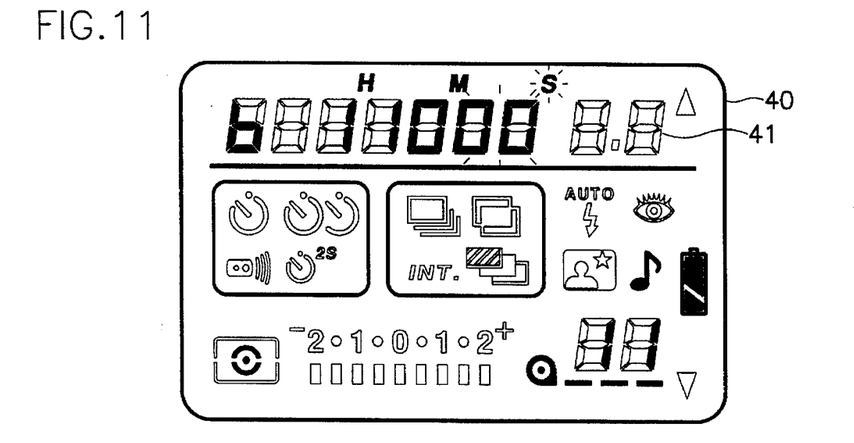
Figure 12:
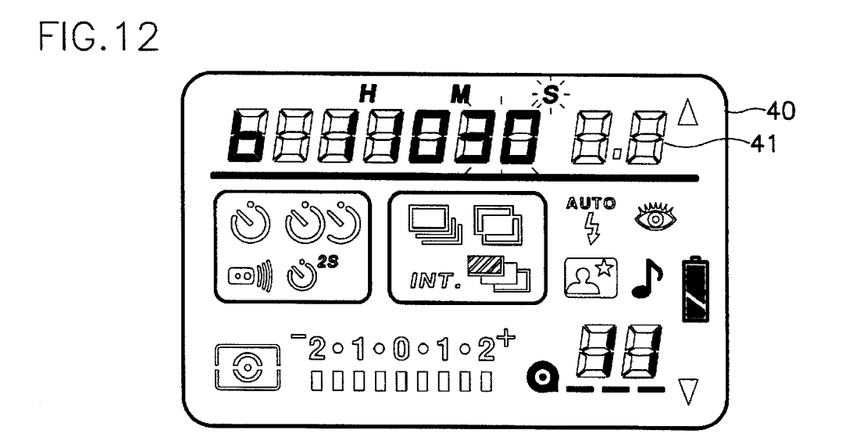
Figure 13:
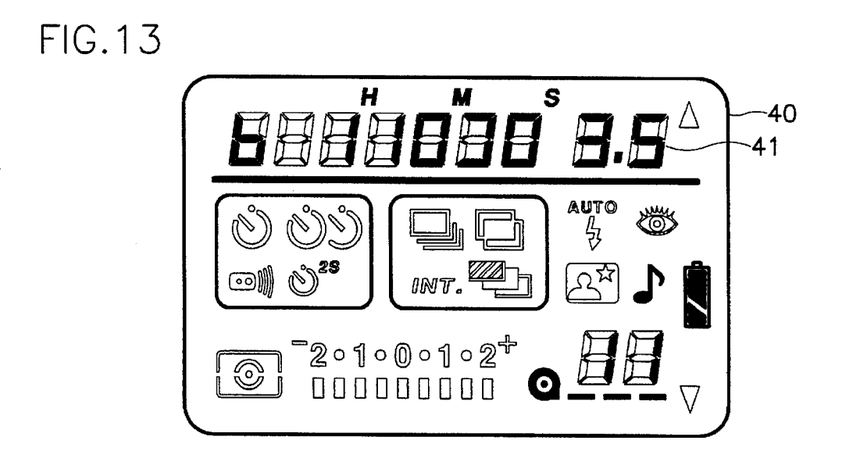

If the hour select switch S43 is not closed, the microprocessor checks to see if the minute select switch S42 in FIG. 1 is closed (Step S50). If it has, the microcontroller sets a minutes select mode and an arbitrary minutes number, e.g. 0, is displayed (Step S52). A minutes select display element 54 is flickered, as illustrated in FIG. 10, (Step S56). If the minutes select switch S42 is not closed, the microcontroller checks to see if the second select switch S58 in FIG. 1 is closed. When the microcontroller finds this select switch to be closed, a seconds select mode is set and an arbitrary number, e.g. 0, is displayed in Step S60, and, in Step 62, a seconds select indicator element 64 is flickered, as indicated at 64 in FIG. 11. When the microcontroller 30 determines that none of the select switches S41–S43 is closed, the subroutine ends.

Turning to FIG. 7B, when the hour select mode is set in Step S44 (FIG. 7A), the microcontroller enters the subroutine at point H and checks to see if the user has closed the time unit decrementing switch S31 in FIG. 1 (Step S66). If it is closed, the arbitrary hours number displayed in the time segment 41 of display 40 is decreased one hour (Step S68). As long as decrement switch S31 remains closed, the displayed hours number is reduced one hour at regular intervals. When the desired number of hours of the exposure time is displayed by time display segment 41, the user opens switch S31. In Step S70, the microcontroller then checks to see if the time unit incrementing switch S32 is closed. If it is, the displayed hours number is incremented by one hour at regular intervals in Step S72.

When the user opens switch S32, the microcontroller checks to see whether the hour select switch S43 is still closed in Step S74. If it is, the subroutine loops back to Step S66 to determine if the user has re-closed decrementing switch S31 or incrementing switch S32, indicating that the user wishes to adjust the hours number of the time exposure setting. When the user opens the hours select switch S43, the microcontroller releases the hour select mode in Step S76 and returns to the subroutine in FIG. 7 at R.

It is seen that the microcontroller 30 then checks to see if the minutes select switch S42 is closed in Step S50, and if it is, sets the minutes select mode S52 as described above. The subroutine then reenters the subroutine at point M in FIG. 7B to handle user adjustments of the minutes number of the exposure time indicated on the time mode segment 41 of display 40.

In the same manner described above for the hours setting, the microcontroller checks to see if the decrement switch S31 is closed (Step S80) and decrements the minutes number in increments of one minute (Step S82) at regular intervals, as long as decrement switch S1 is closed. When decrement switch S31 is opened by the user, the microcontroller checks to see if increment switch S32 is closed (Step S84), and increments the minutes setting at one minute increments in Step S86 at regular intervals as long as switch S32 is closed. When the user opens switch S32, the microprocessor checks to see if minutes select switch S42 is closed (Step S88), and, if it is, loops back to check to see if the user has re-closed either of switches S31 or S32. When the minute select switch S42 is opened, the microprocessor releases the minutes select mode in Step S90, and returns to the subroutine at point R in FIG. 7A to select the desired number of seconds of the exposure time. The microprocessor then loops through Steps S38 and S50 in FIG. 7A to Step S58 to determine if the user has closed second select switch S41. If not, the subroutine is ended. However, if the second select switch S41 is closed, the microcontroller sets the seconds select mode at Step 60, returns to the subroutine in FIG. 7B at point S to allow the user to select the number of seconds desired in the exposure time. The subroutine cycles through Steps S94–S98 until the second select switch S41 is opened, whereupon the seconds select mode is released at Step S99 and the subroutine is ended.

It will be apparent to those skilled in the art that various modifications and variations can be made in the camera control circuit and method of the present invention without departing from the scope or spirit of the invention.

Other embodiments of the invention will be apparent to those skilled in the art from consideration of the specification and practice of the invention disclosed herein. It is intended that the specification and drawings be considered as exemplary only, with a true scope and spirit of the invention being indicated by the following claims.

What is claimed is:

1. A camera control circuit comprising, in combination:
   a mode selector accommodating user selection of a Bulb shutter camera mode of operation;
   a light detector circuit for producing a signal representing ambient light of a scene to be photographed;
   a microcontroller connected to the mode selector and the light detecting circuit for computing a film exposure time period based on the ambient light signal when the user selects the bulb shutter camera mode, the microcontroller including a clock for timing the computed exposure time period, the microcontroller generating a start signal to begin the computed exposure time period and an end signal at the expiration of the computed exposure time period;

a display connected to the controller for displaying the computed time exposure period; and an actuator connected to the microcontroller for opening a camera shutter automatically in response to the start signal, retaining the camera shutter open during the computed exposure time period and closing the camera shutter automatically in response to the end signal.

2. The camera control circuit defined in claim 1, further including means connected to the microcontroller for accommodating up/down user adjustment of the computed exposure time period.

3. The camera control circuit defined in claim 2, wherein the user adjustment means includes a first switch operable by the user to increase the computed exposure time period by uniform time increments, and a second switch operable by the user to decrease the computed exposure time period by the uniform time increments, the microcontroller controlling the display, such as to display user adjustments of the computed exposure time period.

4. The camera control circuit defined in claim 1, further including a control operator actuated by the user between an off position and first and second on positions, in the first on position, the control operator signalling the microcontroller to compute the film exposure time period, and, in the second on position, signalling the microcontroller to generate the start signal.

5. The camera control circuit defined in claim 4, wherein operation of the control operator from the second on position to the off position signals the microcontroller to generate the end signal.

6. The camera control circuit defined in claim 5, wherein the control operator is a three-position shutter switch.

7. The camera control circuit defined in claim 1, further including selection means connected to the microcontroller for enabling a user to select a film exposure time period in place of the computed film exposure time period.

8. A method for controlling operation of a camera having a release switch and a shutter, comprising the steps of:

selecting a bulb shutter operating mode of the camera;

measuring the ambient light of a scene to be photographed by the camera in the bulb shutter operating mode;

computing a film exposure time period, based on the measured ambient light of the scene;

displaying the exposure time period;

detecting a user input when a user compensates the film exposure time period;

compensating the exposure time period in accordance with the user input when detected;

displaying the exposure time period when compensated;

generating a start signal to begin the exposure time period when the release switch is operated and an end signal at the expiration of the exposure time period without the operation of the release switch;

opening the shutter in response to the start signal; and closing the shutter in response to the end signal.

9. The method defined in claim 8, wherein the compensating step includes at least one of the steps of increasing the computed exposure time period by at least one time increment and decreasing the computed exposure time period by at least one time increment.

10. The method defined in claim 8, wherein the opening step includes the steps of generating a start signal to open the shutter to begin a countdown of the film exposure time period, and generating an end signal to close the shutter when the countdown reaches zero.

11. The method defined in claim 10, further including the step of displaying the film exposure period countdown.

12. A control circuit for a camera, comprising, in combination:

a mode selector operable by a user to select a bulb shutter operating mode of the camera;

an exposure time selector operable by the user to select an exposure time period;

a microcontroller for registering the exposure time period selected by the user, the microcontroller generating a start signal to begin the registered exposure time period, timing the registered exposure time period, and generating an end signal upon expiration of the registered exposure time period;

a display connected to the microcontroller for displaying the registered exposure time period to the user; and an actuator connected to the microcontroller for opening a camera shutter automatically in response to the start signal, retaining the camera shutter open during the registered exposure time period and closing the camera shutter automatically in response to the end signal.

13. The control circuit defined in claim 12, further including a light detector for producing a signal representing ambient light conditions of a scene to be photographed;

a distance detector for producing a range signal representing a range of a subject in the scene to be photographed; and an operator connected to the microcontroller and selectively positioned by the user to an off position and first and second on positions, in the first on position, the operator signalling the microprocessor to condition the camera in accordance with the ambient light and range signals, and, in the second on position, signalling the microcontroller to generate the start signal.

14. The control circuit defined in claim 13, wherein the operator is a three-position shutter switch.

15. The control circuit defined in claim 12, wherein the exposure selector includes:

a minute selector for setting a minutes selection mode in the microcontroller, whereupon the microcontroller drives the display to display an arbitrary minutes number;

a second selector for setting a seconds selection mode in the microcontroller, whereupon the microcontroller drives the display to display an arbitrary seconds number; and an up/down numbers selector for incrementing/decrementing the arbitrary minutes and seconds numbers to desired minutes and seconds numbers of a user-selected exposure time period.

16. The control circuit defined in claim 15, wherein the minute and second selectors are movable to first positions to set the minutes and seconds selection modes in the microcontroller, respectively, and movable to second positions to fix the desired minutes and seconds numbers as the registered exposure time period.

17. The control circuit defined in claim 16, wherein the exposure selector further includes an hour selector movable to a first position for setting an hours selection mode in the microcontroller, whereupon the microcontroller drives the display to display an arbitrary hours number, the up/down selector operable to increment/decrement the arbitrary hours number to a desired hours number of the user-selected exposure time, the hour selector being moved to a second position to fix the desired hours number with the desired minutes and seconds numbers as the registered exposure time period.

18. The control circuit of claim 17, wherein the microcontroller is programmed to sequence through the hours, minutes and seconds selection modes in a predetermined order.

* * * * *